Oct. 13, 1925.

M. FRANK

TEA STRAINER

Filed March 13, 1924

Patented Oct. 13, 1925.

1,557,041

UNITED STATES PATENT OFFICE.

MARTIN FRANK, OF GRUHNHAIN, GERMANY.

TEA STRAINER.

Application filed March 13, 1924. Serial No. 698,971.

*To all whom it may concern:*

Be it known that I, MARTIN FRANK, a citizen of the German Republic, residing at Gruhnhain, Germany, have invented certain new and useful Improvements in Tea Strainers, of which the following is a specification.

The tea strainers to be found on the market and having a handle fixed by stamping or in any other convenient manner require much sheet metal as, even when the material is utilized in the most favorable manner, viz by intercutting, there is comparatively much waste of material whereby the cost of manufacture is increased. This inconvenience is almost entirely avoided by the present invention as the tea strainer is made from a blank in the shape of an equilateral triangle, so that it is possible to cut the blanks from a strip or plate of sheet metal in such a manner that almost no material is wasted. The tea strainer according to the invention is constructed so that the corners of the equilateral blank form three flaps situated in the same horizontal plane and serving as handles, each flap having an aperture. The aperture serves to suspend the strainer and to offer a secure grip.

An embodiment of the invention is shown by way of example on the accompanying drawing, in which.

Figure 1:
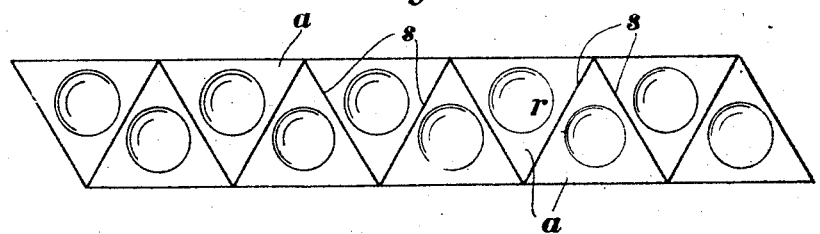
Fig. 1 shows a strip of sheet metal of which the triangular blanks are cut without any waste of material.
Figure 2:
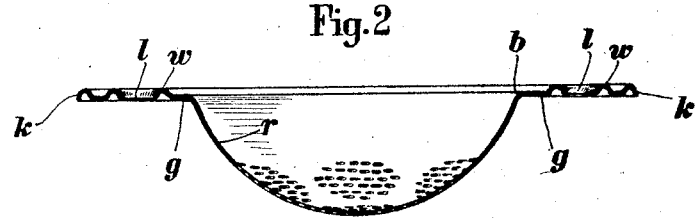
Fig. 2 shows a finished tea strainer in section on line A—A of Fig. 3.
Figure 3:
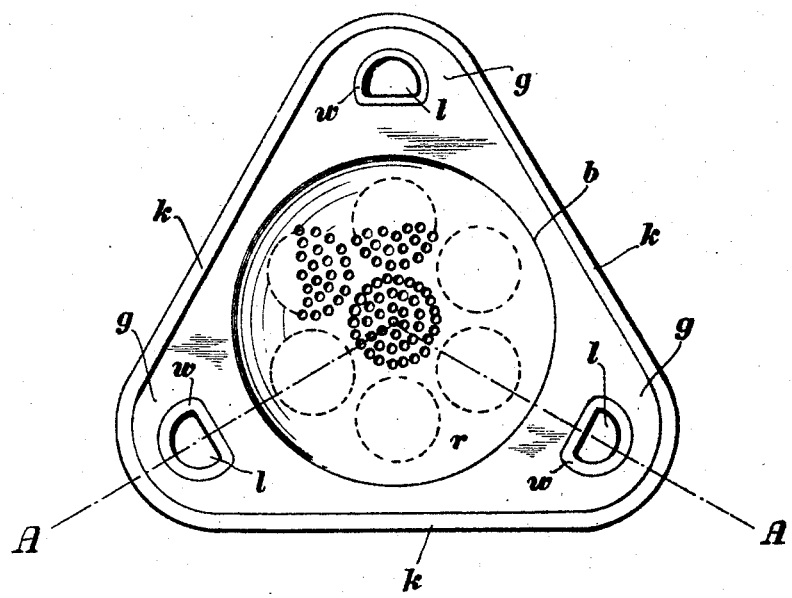
Fig. 3 shows a tea strainer in plan view.

As shown on Fig. 1 the blanks $a$, which have the form of an equilateral triangle, are cut in such a manner that every two adjacent blanks have a common cutting line $s$. Each blank $a$ is stamped so that at the centre a calotte-shaped strainer body $r$ and three flaps $g$ situated in one horizontal plane, rounded at the corners and having each an aperture $l$ are produced. The apertures $l$ are each framed by a bead $w$ so that the strainer can be securely gripped between the thumb and the second joint of the forefinger. The three handle flaps $g$ permit further of the strainer lying uniformly on the rims of tea cups or pots of diameters of different lengths. The commonly used tea strainers with rim of circular cross section do not securely rest on tea cups or pots of different diameters as the rim of such tea strainers is not so broad as the handle flap measured from the outer circumference of the strainer body $b$ to the rounded corner. The edges $k$ of the blank are bent to form beads and they extend at a short distance from the circumference of the strainer body $b$, but they might also touch this circumference.

As a considerable economy of material is realized at the manufacturing of the tea strainers according to this invention the cost of manufacture is considerably lower than that of the commonly used tea strainers. The improved tea strainer may be drawn from sheet iron and enamelled or it may be made from any other sheet metal.

From the hygienic point of view the tea strainer according to the invention is a great improvement over the tea strainers used at present as when the strainer is being handed over from one person to the other it is instinctively gripped at one of the two free flaps so that the strainer body will never be touched with the fingers. The tea strainer can be easily suspended as two holes are always at disposal when the strainer is gripped with the hand.

I claim:—

A tea strainer stamped from a blank of sheet metal which has the shape of an equilateral triangle the three corners of which form each a flap which are all situated on one horizontal plane and have each an aperture the edges of which are beaded.

In testimony whereof I affix my signature.

MARTIN FRANK.